EMULSION TREATERS AND EMULSION TREATING METHODS

Original Filed Feb. 16, 1959 4 Sheets-Sheet 1

INVENTOR.
CLARENCE O. GLASGOW
BY Arthur L. Wade
ATTORNEY

EMULSION TREATERS AND EMULSION TREATING METHODS

Original Filed Feb. 16, 1959 4 Sheets-Sheet 2

INVENTOR.
CLARENCE O. GLASGOW
BY Arthur L Wade
ATTORNEY

EMULSION TREATERS AND EMULSION TREATING METHODS

Original Filed Feb. 16, 1959 4 Sheets-Sheet 3

INVENTOR.
CLARENCE O. GLASGOW
BY Arthur L. Wede
ATTORNEY

EMULSION TREATERS AND EMULSION TREATING METHODS

Original Filed Feb. 16, 1959 4 Sheets-Sheet 4

INVENTOR.
CLARENCE O. GLASGOW
BY Arthur L Wade
ATTORNEY

United States Patent Office

Re. 25,504

Reissued Dec. 31, 1963

25,504

EMULSION TREATERS AND EMULSION TREATING METHODS

Clarence O. Glasgow, Tulsa, Okla., assignor to National Tank Company, Tulsa, Okla., a corporation of Nevada Original No. 3,009,536, dated Nov. 21, 1961, Ser. No. 793,596, Feb. 16, 1959. Application for reissue Sept. 6, 1962, Ser. No. 222,769

51 Claims. (Cl. 55—42)

Matter enclosed in heavy brackets [ ] appears in the original patent but forms no part of this reissue specification; matter printed in italics indicates the additions made by reissue.

The present invention relates to emulsion treaters and emulsion treating methods. The invention is particularly concerned with processing oil well production in the field in order to separate the production into oil, water and gas.

Oil well production varies widely in quality, between localities. Some black asphaltic base crude oil production in various parts of the world has relatively little gaseous phase and its gravity is low, in the order of 25 or 30 API to 9 or 10 API. This production often has a great deal of foam. Also the union between the water and oil is relatively strong, or "tight." On start-up, during intermittent treating operation, the low gravity production is difficult to melt from its congealed condition in the treating apparatus, particularly the coalescing section. The foam is difficult to reduce quickly and effectively. When a single source of heat is applied to the production to break the tight emulsion, the skin temperature of the heat source must be developed so high that thermal decomposition of the hydrocarbons results in coking of the surface of the heat source. Also, if the production is not passed over the heat source with relatively long residence time, and there is a relatively high skin temperature required, thermal agitation will not be developed with which to wet the surface of the heat source and prevent vaporization of the mineral-carrying water of the production, leaving scale deposits on the surface of the heat source.

Another problem met in areas producing these black asphaltic base crude emulsions is a dimensional one of the apparatus in which the process is carried out. Local ordinances may prohibit these structures extending as high as a common vertical treating vessel. The lease owner may wish to cooperate with civic programs to shield unsightly treating apparatus from the public gaze. Also, in remote areas, labor may not be available with which to set the vertical structures. Therefore, the peculiar treating problems of these productions have added *to* the problem *of* solving the treating problems in apparatus which is horizontally arranged.

A primary object of the present invention is to apply a source of heat so as to reduce the foam of oil well production effectively at the beginning of its treating process.

Another object is to supply heat to oil well production so as to greatly reduce, or eliminate, coking and/or scaling on the surface of a heat source.

Another object is to mechanically manipulate oil well production and apply heat to it at a plurality of locations so as to thoroughly mix the production with any emulsion-breaking chemical that may have been added and raise the temperature of the production to where it is completely prepared for optimum coalescence of its water and oil.

Another object is to conserve the gravity of the final clean oil product by condensing all liquefiable components of the gas evolved from the production prior to coalescence of the water and oil while preventing condensation of water vapor from gas above the clean oil back into the clean oil as it is removed from the process.

Another object is to develop a differential between the pressures on surfaces of liquids in the treating process to move the production liquids through the steps of the process.

Another object is to provide a structural arrangement for vessel compartments in which the treating process takes place, the vessel compartments being in substantial horizontal alignment.

The present invention contemplates treating a low-gravity, high viscosity, foaming oil well production by initially heating the production by dispersing it in a body of [water] *production* which has been heated enough to effectively reduce the foam and militate against its thermal decomposition in coking on the surface of a subsequent heat source.

The invention further contemplates the initial heating being controlled to reduce the viscosity of the production sufficiently to raise the efficiency of heat transfer from the heat source to the production enough that the skin temperature of a subsequent heating source need not be so high that it will cause thermal decomposition of hydrocarbons on its surface.

The invention further contemplates that baffles mounted in the body of [water] *production* will mechanically manipulate the production in spreading the production washed therein into thin sheets from which the lighter hydrocarbon gas will readily evolve, or breakout, in foam reduction and gas release and which will cause the production to heat more efficiently in viscosity reduction and which will cause the production to mix more thoroughly with any emulsion-breaking chemical added.

The invention further contemplates the initial heating being followed by a second heating with a source of heat hot enough, in a body of the production large enough, to set up thermal currents which thoroughly agitate the body of production in completing the mixing with the chemical and raising it to the temperature where it is completely prepared for optimum coalescence of its water and oil. The production is flowed downwardly over the second source of heat so the final stage of degassing is accomplished in the upper region of the body of production and disturbance from degassing is kept to a minimum. The production has been reduced in viscosity by the first heating so the skin temperature of the second heat source need not be high enough to result in scaling and coking in getting the production up to the final treating temperature.

The invention further contemplates the gas evolved from the plural stage heating being conducted through a heat exchanger in which a cool stream of fluid condenses all liquefiable components of the gas and the liquids are returned to the production passing downwardly over the second heat source to maintain the gravity of the final clean oil product. The remaining unliquefied gas is passed over the surface of the clean oil product, combining with any gas evolved above its surface. However, the liquids passed from the initial heating to the subsequent heating are heat-exchanged with the gas to prevent condensation of any water vapor therefrom into the clean oil.

The invention further contemplates sensing the level of liquids flowed downwardly over the second source of heat and controlling the withdrawing of the gas evolved from the liquids of the production heated in developing a differential between the pressure on the surface of liquids heated and the pressure on the clean oil to move clean oil from the process to storage or use, and at any desirable working pressure within the safe range of the vessel.

The present invention further contemplates a series of separate vessel compartments, one compartment providing the *first* body of heated *production* [water], another compartment providing [the] *a second* collection of the well stream large enough to give the required residence time and thermal agitation. And another compartment providing the treating coalescence. The compartments are normally within a single vessel and in horizontal alignment. However, the compartments can be in separate vessels, connected by conduits.

The invention further contemplates placing the treating coalescence compartment between the other two compartments in a horizontal vessel so the connecting passage between the other two compartments will heat-exchange with the top of the treating coalescence compartment to keep the gas above the clean oil warm enough to prevent water vapor in the gas from condensing into the clean oil.

Other objects, advantages and features of this invention will become more apparent to one skilled in the art upon consideration of the written specification, appended claims, and the attached drawings wherein;

FIG. 3 is a diagrammatic sectioned elevation of a modification of the FIG. 1 vessel embodying the invention.

Figure 1:
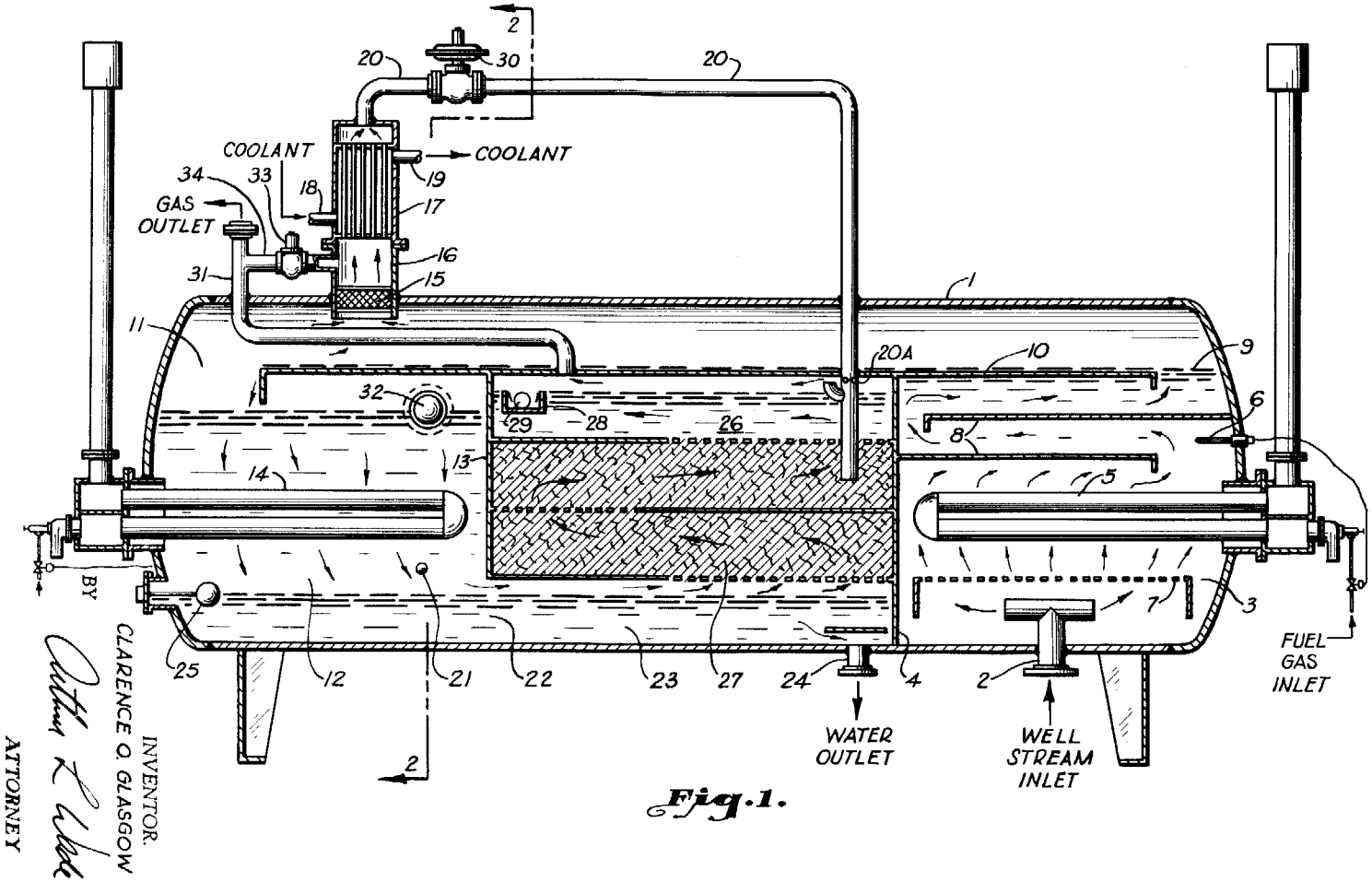
FIG. 1 is a diagrammatic sectioned elevation of a vessel embodying the invention.

Referring specifically to FIG. 1, there is shown the essential components of an oil well production treater. With the components of this treater as disclosed, the process of the invention may be carried out. A quite diagrammatic style of illustration has been utilized for both simplicity and clarity.

The treater of FIG. 1 is characterized by a shell 1 to which the production of an oil well is brought in conduit 2. Conduit 2 introduces the production into first compartment 3 within shell 1.

Compartment 3 is essentially defined in one end of shell 1 by partition 4. A conventional form of gas-fired heater 5 is mounted within compartment 3. The combustion of gas within the tube of heater 5 is automatically controlled by a system responding to the temperature sensed by element 6. Element 6 is inserted directly into compartment 3, being immersed in the liquid within compartment 3 which is heated by the tube of heater 5.

It is contemplated that a *first* body of [water] *production* will fill compartment 3. The oil well production introduced into compartment 3 by conduit 2 will be dispersed through the *first* body of heated *production* [water] by conventional spreader structure illustrated at 7. [Free water will drop out of the production rapidly in compartment 3, maintaining the inventory of water therein. Surplus water constantly overflows from compartment 3, along with oil well production heated thereby.]

The *first* body of *production* [water], heated as it is, to within a predetermined temperature range, starts the treating process. Low-gravity, high-viscosity, foamy oil well production, dispersed through the *first* body of heated *production* [water], is brought up to temperature by contact with the *first body of heated production* [water] until the viscosity of the production is lowered a desired amount.

When the viscosity of the *dispersed* production is lowered the desired amount, the foam of the *dispersed* production will be reduced because of the weakening of the vapor tension of the gas bubbles which make up the foam. Additionally, the viscosity reduction will raise the heat transfer rate between the production and the heating structures of the process. These results are brought about by close regulation of heater 5 with the control system of element 6 in bringing the temperature of the production, dispersed up through the *first body of production* [water] of compartment 3, within the predetermined temperature range.

Baffles 8 represent additional structure within compartment 3 which contributes to the new results attained by the invention. The baffles 8 represent structure used to prolong the travel time of the dispersed emulsion up through the *first* body of heated *production* [water]. These baffles will spread the *dispersed* emulsion into relatively thin sheets as the *dispersed* production is heated. Spreading the production in this manner reduces the breakout time of gas bubbles within the production. Further, this function of spreading the production into thin sheets promotes the efficiency of heat transfer, by conduction, from the [water] *heated production* to the dispersed emulsion. Of course, as the travel of emulsion through the *first heated production* [water washing] bath is prolonged by its serpentine path upward through compartment 3, there is greater opportunity for the heat of the *first heated production* [water] bath to raise the temperture of the *dispersed* production. Additionally, the baffle structure, in spreading and re-spreading the emulsion into thin sheets, agitates the production and any chemical which may have been added thereto. The result is the beginning of a thorough mixing process which brings the emulsion and emulsion-breaking chemical into close contact so the chemical may function efficiently.

After passing up through compartment 3, the *dispersed* production passes out of the compartment through opening 9. Opening 9 is defined between the right-end head of shell 1 and an end of elongated partition 10 running almost the length of shell 1. With the upper walls of shell 1, horizontal partition 10 forms an elongated passage along the top of shell 1. Through this elongated passage passes [heated water of compartment 3,] the *dispersed* production, and any emulsion-breaking chemical that may have been added thereto *in a thin sheet of liquid over the partition 10*. The gaseous components of the production which have been evolved in compartment 3 are also passed out of opening 9. All of these products from compartment 3 are passed down the elongated passage, over partition 10, to a second compartment in the opposite end of shell 1. During their passage along partition 10, the heated *production, dispersed production* [water, emulsion] and chemical are given an opportunity to mix more thoroughly, bringing the temperature of the *dispersed* emulsion closer to that of the heated *production* [water]. *Additional gas is released from the liquids.* All of these liquid products are then flowed downwardly through opening 11 and into compartment 12.

Compartment 12, similar to compartment 3, is basically characterized in the opposite end of shell 1 by a vertical partition 13 which is parallel to partition 4. Also similar to compartment 3, second compartment 12 has a heater 14 mounted therein. All the liquids flowing from compartment 3, along horizontal partition 10 are flowed downwardly over the tube of heater 14, mounted as it is in compartment 12. Compartment 12 provides an additional, novel, function to this heating process.

The basic function of compartment 12 is to establish a *second* collection of the liquid components of the well stream large enough to provide substantial residence time and thermal agitation which will thoroughly mix the production, and any chemical added thereto, and complete the degassing of the production. Bringing the liquids downwardly over the tube of the heater 14 provides for degassing to occur in the upper regions of the body of liquid within compartment 12. Evolving these gaseous components in the upper regions of this *second* body of production tends to keep the liquids from being unduly agitated by the evolving gas.

The liquids of compartment 12 are heated by the tube of heater 14. Heater 14 is regulated as heater 5 in compartment 3 is regulated. The heat output of heater 14 sets up thermal currents in the compartment 3 liquids given the long residence time because of the capacity of compartment 3.

The thermal agitation in compartment 3 continues the mixing of the production and chemical. Additionally the thermal agitation will raise the temperature of the production to within the range which will completely prepare the production for optimum coalescence of its water and oil. Also, substantially all of the gas to be evolved at the final treating temperature will be so evolved in the upper regions of compartment 12.

A temperature element 21 is indicated as positioned below the tube of heater 14. Element 21 controls the gas-firing of heater 14, similar to the control of heater 5 by element 6. It is contemplated that element 21 will be located in the liquids of compartment 12 at a position where the control exerted over heater 14 will result in bringing the liquids to within the desired range of temperature as they leave the bottom of compartment 12 through opening 22.

The final heating afforded by heater 14 is accomplished efficiently, and with little coking and scaling on the heater tubes. The lowered viscosity provides a relatively high rate of heat transfer from the tubes of heater 14 to get the temperature at element 21 to within the desired range of temperature with the minimum consumption of fuel. The suppression of the skin temperature of heater 14 to a minimum also results in avoiding the coking and scaling on the surface of the heater 14 which would take place, at higher skin temperatures.

Coking is basically a result of thermal decomposition of hydrocarbons. The lower the temperature to which the hydrocarbons are exposed, the less coking will occur. Therefore, the suppressed skin temperature of heater 14 is a basic contribution to this result. Also, however, the thermal currents set up in compartment 12 promote oil-wetting of the surface of heater 14 by the agitation. Oil-wetting of the surface of heater 14 militates against scale.

Scale is basically a result of vaporizing mineral-carrying water in the production. The suppressed skin temperature, of course, reduces the scaling possibility. However, the oil-wetting of the surface of heater 14 reduces the possibility of scale formation. Water has far less tendency to vaporize on an oil-wetted surface and leave any mineral entrained therein. The thermal agitation in compartment 12 causes oil to continually wipe the heater 14 surface and keep it wetted. The resulting scale reduction follows.

The breaking of the union between the oil and water components of the production, which began in compartment 3, culminates in the lower regions of compartment 12. The heat from the plurality of sources provided in the compartments raises the temperature of the production, degasses the production and thoroughly mixes the production with any emulsion-breaking chemical introduced therein. By the time the production has traveled down over heater 14 in compartment 12, a large percentage of the water has been broken away from the oil. The collection of water at 23 represents, in part, that water which is precipitated downwardly from compartment 12. This water is removed through conduit 24 in accordance with the control exerted by a float 25. The remaining emulsion passing through opening 22, from compartment 12, has been completely prepared for optimum coalescence within a structure provided in a third compartment of vessel 1.

All gaseous components evolved in the first compartment 3, within the elongated passage of partition 10, and the upper regions of compartment 12, are passed out shell 1 through a conventional mist extractor structure 15 mounted in gas head 16. A heat exchanger 17 is mounted on the top of gas head 16. All the gaseous components evolved are brought into heat exchanger 17 and into indirect contact with a stream of coolant. This stream of coolant is indicated as coming to heat exchanger 17 through conduit 18 and leaving heat exchanger 17 through conduit 19. The coolant provided for heat exchanger-condenser 17 may be from any cool stream of fluid available. The well stream of conduit 2 may well have a temperature adequate for this purpose. Of course, any cool stream of water available within the proper temperature range can be used.

It is contemplated that all liquefiable components of the gaseous stream passing up through head 16 will fall back through head 16 and onto partition 10. From partition 10, directly above compartment 12, these condensed liquids will join the liquids dropped into compartment 12 through opening 11. The uncondensed portion of the gases up through head 16 are removed from condensing heat exchanger 17 through conduit 20. Conduit 20 introduces these gaseous components back into shell 1 of the treater. Should there be any liquid carry-over from exchanger 17, conduit 20 extends down into compartment 26 far enough to place the liquids well below the surface of the clean oil produced. Holes 20A place the gas from conduit 20 above the clean oil surface in compartment 26.

Third compartment 26 is provided between first compartment 3 and second compartment 12 within shell 1. The compartment 26 is more specifically defined by partition 4, a portion of partition 10 and partition 13. Vertical partition 13 extends down from partition 10 to a point above the bottom of shell 1 to provide the opening 22.

A conventional hay section is provided between partition 4 and partition 13 to act as a treating-coalescing structure for the emulsion passed by up through it from opening 22. The hay section 27 illustrated is shown as having two sections defined by horizontal imperforate plates and expanded metal sections. The expanded metal sections and imperforate plates are arranged to provide a serpentine path upward for the emulsion from compartment 12. The coalescing function of a hay section is well known. The globules of oil agglomerated in this coalescing hay will migrate upward, and the droplets of water agglomerated by the section will migrate downward to join the collected body of water 23. The result is to collect a body of clean oil in the upper portion of compartment 26 above the hay section from which oil will be removed from vessel 1 by a skimmer 28 through conduit 29.

The three compartments within shell 1 are illustrated in horizontal alignment. Obviously, it is feasible to provide separate vessels, as compartments, which can be connected by conduits through which to move the fluids of the process. Arranged as they are, the three compartments of vessel 1 have the problem of forcing the clean oil from the collection of oil in the upper portion of compartment 26. It is difficult to provide a sufficient head for this purpose in a horizontal vessel. The present invention provides a substitute for this head force.

The uncondensed gases of conduit 20, from the top of exchanger-condenser 17 are placed on the top of the clean oil surface in compartment 26 through differential valve 30. Conduit 31 is provided to remove this gas from the surface of the clean oil in compartment 26 for disposal in any desired manner. It is contemplated that the disposal location for the gases of conduit 31 has a pressure substantially less than the pressure developed by the gases evolving up through the head 16 and into condenser 17. Therefore, a modulation of the position of valve 30 will develop a differential of pressure between the first two compartments and compartment 26 above the surface of the clean oil. This differential of pressure will provide the force on the surface of the liquids in compartment 12 which will remove the liquids from compartment 12, into compartment 26 and out conduit 29.

Differential valve 30 is modulated from the level of liquids in compartment 12. Specifically, float 32 is actuated by the surface of the compartment 12 liquids to develop a control force for differential valve 30. As the liquid inventory in compartment 12 increases from the supply from the conduit above horizontal partition 10, float 32 will develop a control pressure for differential valve 30 which will move valve 30 closed, increasing the differential pressure between that pressure on the liquid surface of compartment 12 and that pressure on the oil surface of compartment 26. The result is to move liquids from compartment 12 to compartment 26 and remove oil through conduit 29.

A safety valve 33 is provided in conduit 34 between gas head 16 and conduit 31. This provision for the release of excess pressure within shell 1 is desirable should the control system malfunction in the modulation of valve 30 or the hay section plug, or clog, with solid matter.

FIG. 1 shows to advantage the unique arrangement of compartments within shell 1 to provide a control of the temperature of liquids and gases within compartment 26. Should water vapor be carried from exchanger-condenser 17 through conduit 20, it would be most undesirable to condense this water vapor into the clean oil removed through conduit 29. Therefore, the arrangement illustrated in FIG. 1 keeps the gas space above the clean oil in compartment 26 warm enough to prevent condensation of water vapor by reason of heat exchange with the liquids of compartment *3* [13] which travel along partition 10 directly above compartment 26 enroute to compartment 12.

Figure 2:
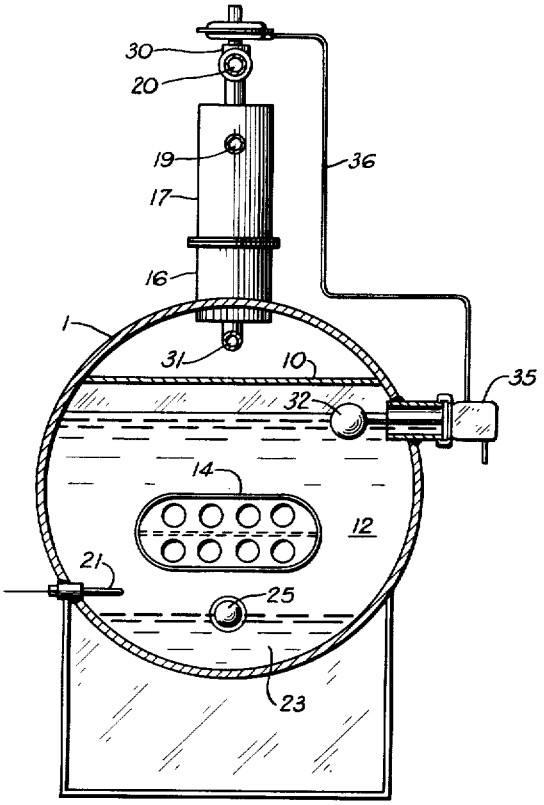
FIG. 2 is a section along lines 2—2 of FIG. 1.
Figure 5:
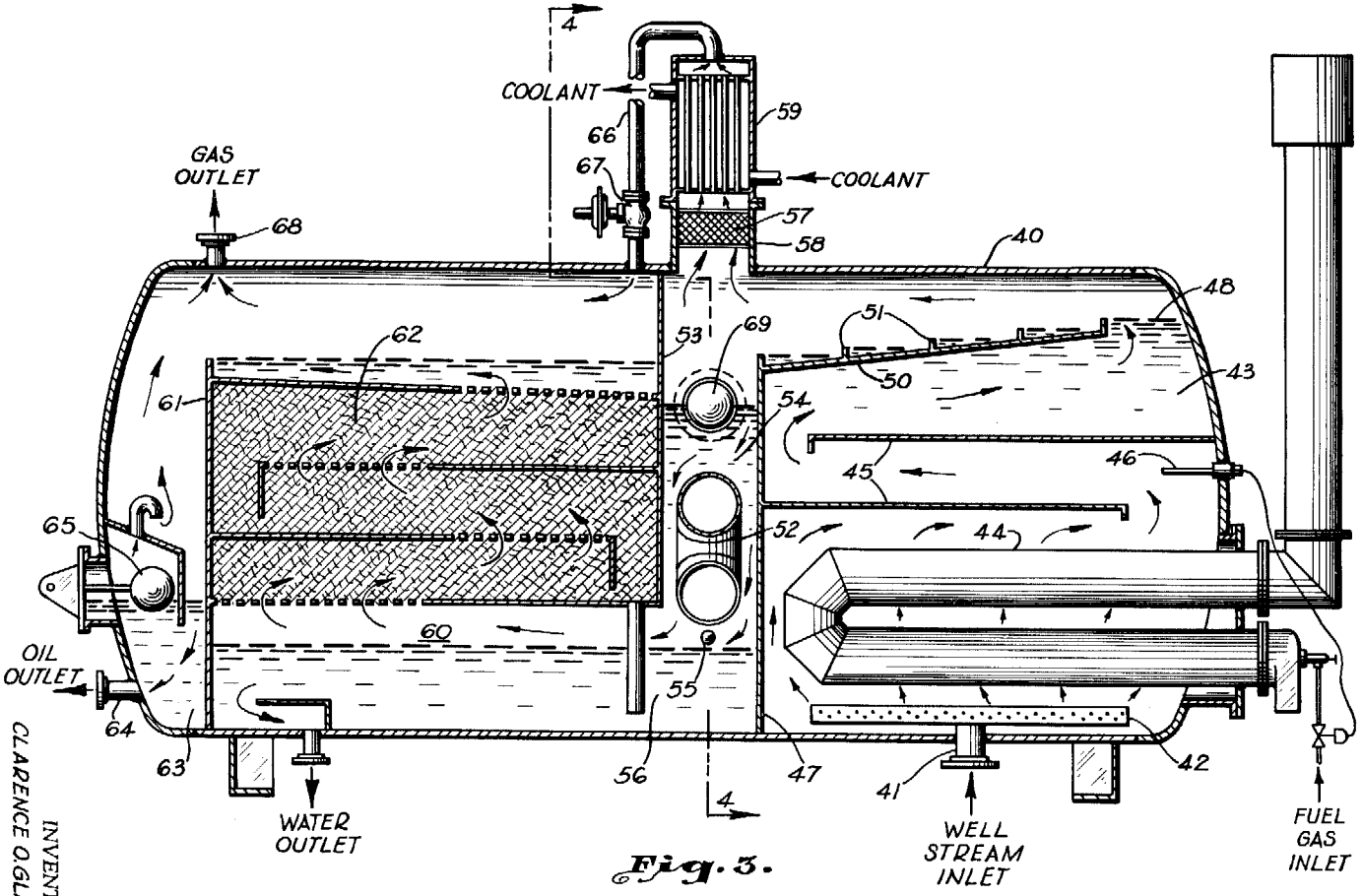

FIG. 2 illustrates more completely the control float 32 has on differential valve 30 which it modulates. Additionally, a possible position for element 21 in compartment 12 is illustrated. Float 32 is shown as mechanically actuating a mechanical-fluid pressure transducer 35 to produce a control fluid pressure in conduit 36 which can be placed on a diaphragm of valve 30 to modulate the position of the valve.

Referring now to FIG. 3, a modification of the FIG. 1 structure is illustrated, also embodying the invention. An elevated cross-section of a shell 40 is shown to illustrate a treating vessel with a horizontally extended longitudinal axis.

Oil well production is conducted into shell 40 through conduit 41 and spread, or dispersed, by the perforations of spreader 42. Spreader 42 is mounted in the bottom of compartment 43, from which position it disperses production from conduit 41 upwardly through the liquids in compartment 43.

Heater 44 is mounted above spreader 42 to heat the liquids in compartment 43, along with the production from spreader 42. Baffles 45 are mounted above heater 44 to mechanically manipulate the production as the emulsion and gas is heated in its upward passage.

The temperature of the liquids in compartment 43 is controlled by a system which fires heater 44 from the temperature sensed by element 46. The control system responsive to this temperature is similar to that which includes element 6 in FIG. 1.

The complete process of manipulation and heating of the production in compartment 43 is similar to the process carried out in compartment 3 of FIG. 1. Partition 47 defines the left limit of compartment 43 and the right limit is defined by the right end of vessel shell 40. It is contemplated that compartment 43 will remain substantially full of *production* [water] with which the dispersed production is heated as it travels upwardly through the [water bath] *heated production. Production is* [Surplus water and production are] withdrawn through opening 48 at the top of compartment 43. Thus, the production receives an initial treating by being heated by the *production* [water] in compartment 43, is mixed to an extent with any added chemical and has its viscosity lowered and is degassed to an extent.

A tray 50 is mounted near the top of vessel 40, defining the top of compartment 43. Tray 50 is mounted at an angle to the horizontal axis of the vessel so that liquids from opening 48 will flow out of compartment 43 and down over tray 50. Step-baffles 51 are placed at intervals along tray 50, extending at right angles to the liquid flow. This arrangement provides a cascading of the liquids which promotes additional degassing and mixing of the liquids. The degassed liquids from tray 50 are finally dropped downwardly over heater 52.

Figure 4:
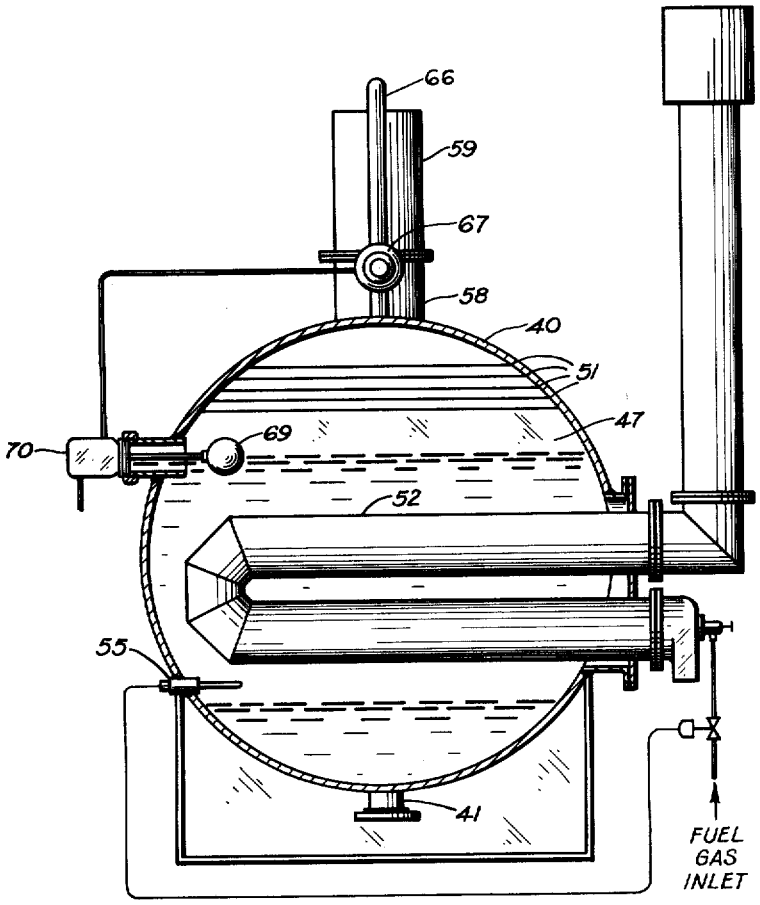
FIG. 4 is a section along lines 4—4 of FIG. 3.

Heater 52 is mounted in a vessel compartment defined substantially between horizontal partition 47 and horizontal partition 53. FIG. 4, is a cross-sectional elevation taken along lines 4—4 in FIG. 3 to illustrate that heater 52 is mounted generally at a right angle to the longitudinal axis of vessel 40. This disclosure serves to illustrate the flexibility of the arrangement between heater 52 and its compartment 54 which provides for adjusting the size of compartment 54, should this be desired. If other considerations permit, this arrangement specifically provides for partitions 47 and 53 to be placed close together, in contrast the FIG. 1 arrangement, to form a compartment 54 which is relatively small. At least one result of this arrangement is the possibility of establishing an overall length of vessel 40 which is materially less than that of vessel 1. In any event, compartment 54 functions generally in the same manner as compartment 12 of FIG. 1.

The production from compartment 43 flows downwardly over heater 52 in compartment 54. Additional gas is released in the upper regions of the compartment 54. The firing of heater 52 is controlled from element 55 in bringing the production up to treating temperature as it passes out opening 56 to the coalescing section. The thermal agitation by heater 52, the mixing of the production and any added chemical, the final evolvement of gas in the upper regions of compartment 54, the avoidance of coking and scaling, the lowered fuel consumption by heater 52 and the final preparation of the production for optimum coalescence all take place in compartment 54 as they do in compartment 12 of FIG. 1.

All gaseous components evolved are passed out of shell 40 through mist extractor 57 mounted in head 58. Heat exchanger 59 functions to liquefy a portion of the gas after the fashion of exchanger 17 in FIG. 1. The liquid condensed falls into compartment 54 to maintain the gravity of the final clean oil product of the process.

The third compartment 60 is provided between partitions 53 and 61 for the coalescing section. The coalescing section is formed of hay, or excelsior, at 62, as in compartment 26 of FIG. 1. Baffles, as indicated, may form a serpentine path upward for the oil, through section 62. The body of clean oil above the section 62 discharges over the upper edge of partition 61 as a weir. In contrast to the FIG. 1 arrangement, compartment 60 is arranged between compartment 54 and the left end of vessel 40, rather than between the two heating compartments in which the heating of the production is staged. This arrangement retains benefits of the up-flow, down-flow stage heating while providing for heater 52 to be inserted in the compartment 54 from the side of vessel shell 40 in making a more compact arrangement.

The clean oil flowing from section 60, over the upper weir edge of partition 61, collects between partition 61 and the left end of the vessel shell 40, in a body 63. Clean oil is drawn from this collection through conduit 64, valved under the control of float 65.

The gas evolved in the compartments of 43 and 54, are passed out of head 58 and exchanger 59 and into conduit 66. Conduit 66 passes through valve 67, and conduit 66 introduces the evolved gas into the space above the clean oil in the compartment 60. All gas to the left of partition 53 is removed through conduit 68. Valve 67 is positioned by a control signal developed by the response of float 69 to the level of the liquids in compartment 54.

FIG. 4 shows float 69 to further advantage, responding to the liquid level in compartment 54 to develop a fluid pressure with control unit 70 for the diaphragm of valve 67. Controlled in this manner, valve 67 restricts conduit 66 enough to maintain sufficient differential between the gas pressures on the liquid surfaces of compartments 54 and 60 to overcome the variable restrictions to liquid flow to the coalescing section 60. The liquid level in compartment 54 is an excellent end-point index of all variables of the process which affect the flow of liquids through the vessel 40. These variables may be in the variation in the production of flow through conduit 41, or in resistance to flow through coalescing section 60. The resistance to flow through coalescing section 60 may be due either to the flow friction due to temperature variation or the mechanical impediment of solid particles in the section. In any event, all these variables influence the liquid level in compartment 54, and, therefore, are automatically applied to positioning of valve 67 in maintaining a dynamic fluid pressure force to move the liquids out of the vessel 40.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and *is* [it] within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. The method of treating oil well production including, maintaining a *first* body of [water] *production* within a first predetermined range of temperature, *with* a first source of heat, passing *dispersed* oil well production up through the body of [water] *heated production* to lower the viscosity of the *dispersed* production to where foam of the *dispersed* production will be effectively reduced, passing [water of the heated body and] *heated production and dispersed* production along an elongated common path, after first heating, maintaining a *second* body of the production within a second predetermined range of temperature with a second source of heat, passing the *heated production and dispersed* [water and] production from the elongated common path down through the *second* body of the production with residence time sufficient to thoroughly mix the production by thermal currents created by the second source of heat and to further degas the production and to prepare the production for coalescence, passing the production through a zone of coalescence to coalesce the oil and migrate it upward and coalesce the water and migrate it downward, and maintaining vapors evolved from the body of oil above the coalescence zone in heat transfer relationship with the *heated production and dispersed* [hot water and] production in the common path to prevent condensation of water vapor directly onto the surface of the oil.

2. The method of claim 1 including, developing a pressure differential across the zone of coalescence to force the oil out of the coalescence zone.

3. The method of claim 2 including, developing the pressure differential across the zone of coalescence with the level of the *second* body of the production within the second predetermined range of temperature.

4. The method of claim 3 including, adding an emulsion-breaking chemical to the production prior to [passing] *dispersing* the production up through the *first* body of [water] *production* heated to the first predetermined range of temperature.

5. The method of claim 3 including, removing the hydrocarbon vapors from the degassed production, cooling the hydrocarbon vapors to condense the portion of them which can be stored under substantially ambient temperatures and pressures, and returning the liquids condensed to the *second* body of production, within the second predetermined range of temperature.

6. The method of claim 5 in which the cooling of the hydrocarbon vapors is obtained by heat transfer with the oil well production going to the *first* body of [water] *production* heated to a first predetermined range of temperature.

7. The method of treating oil well production including, heating a *first* body of *production* [water] to within a first predetermined range of temperature with a first source of heat, dispersing a foamy oil well production upwardly through the *first* heated body of [water] *production* to lower the viscosity of the *dispersed* production to where the foam will be effectively reduced, passing the *dispersed* production downwardly over a second source of heat in a *second* body of production heated to a second predetermined range of temperature and of a size to give a residence time which will enable the thermal currents developed by the second source of heat to roll and mix and degas the production to a substantial degree, controlling the release of gas from the first and second heating to develop a force on the surface of the production heated to the second predetermined range of temperature to maintain the level of the surface at a predetermined height, passing the production from the *second* body heated to the second predetermined range of temperature upwardly through a coalescence zone and collecting the oil above the zone and withdrawing the oil from the process, and maintaining the collected oil and vapor above the collected oil in heat transfer relationship with the *dispersed* production and [water] *production* from the *first* heated body of [water] *production* to prevent condensation of water from the vapor into the oil collected and withdrawn.

8. The method of claim 7 including, adding an emulsion-breaking chemical to the production prior to dispersing the production through the *first* heated body of [water] *production*.

9. The method of claim 8 including, removing the gas released from the heating of the *dispersed* production, cooling the gas released from the *dispersed* production by heat to condense storageable liquids therefrom, and returning the condensed liquids to the *second* body of production heated to the second predetermined range of temperature.

10. The method of treating oil well production including, maintaining a *first* body of [water] *production* within a first predetermined range of temperature with a first source of heat, controlling the firing rate of the first source of heat to maintain the skin temperature of the first heat source below that at which coking will occur on the surface of the first heat source, [passing] *dispersing* oil well production up through the *first* body of [water] *production* to lower the viscosity of the *dispersed* production to where foam of the *dispersed* production will be effectively reduced, maintaining a *second* body of the production within a second predetermined range of temperature with a second source of heat, controlling the firing rate of the second source of heat to maintain the skin temperature of the second heat source below that at which coking will occur on the surface of the second heat source, passing the *dispersed production* [water] and production from the first body of *production* [water] down through the *second* body of production with residence time sufficient to thoroughly mix the production by thermal currents created by the second source of heat and to further degas the production and to prepare the production for coalescence, flowing the broken emulsion through a zone of coalescence to coalesce the oil and migrate it upward and coalesce the water and migrate it downward, and withdrawing the gas and water and oil separately.

11. The method of claim 10 including, developing a pressure differential across the zone of coalescence to force the oil out of the coalescence zone.

12. The method of claim 11 including, developing the pressure differential across the zone of coalescence with the level of liquids within the second predetermined range of temperature.

13. The method of claim 12 including, adding an emulsion-breaking chemical to the oil well emulsion prior to flowing upwardly all of the *dispersed* production *to* be treated through the *first* body of [water] *production* within the first predetermined range of temperature.

14. The method of claim 13 including, cooling the withdrawn gas to condense storageable liquid hydrocarbons and returning the liquids to the emulsion passed downwardly through the *second* body of production within the second predetermined range of temperature.

15. The method of treating oil well production including maintaining a *first* body of [water] *production* within a first predetermined range of temperature with a first source of heat, controlling the firing rate of the first source of heat to maintain the skin temperature of the first heat source below that at which coking will occur on the surface of the first heat source, [passing] *dispersing* oil well production up through the *first* body of [water] *production* to lower the viscosity of the *dispersed* production to where foam of the *dispersed* production will be effectively reduced, maintaining a *second* body of the production within a second predetermined range of temperature with a second source of heat, controlling the firing rate of the second source of heat to maintain the skin temperature of the second heat source below that at which coking will occur on the surface of the second heat source, passing the *dispersed production* [water] and production from the first body of *production* [water] down through the *second* body of production with residence time sufficient to thoroughly mix the production by thermal currents created by the second source of heat and to further degas the production and to prepare the production for coalescence, flowing the broken emulsion upwardly through a zone of coalescence between the *first* body of [water] *production* within the first predetermined range of temperature and the *second* body of production within the second predetermined range of temperature to heat exchange with the broken emulsion while oil is coalesced and migrated upward and water is coalesced and migrated downward, and withdrawing the gas and water and oil separately.

16. The method of claim 15 including, developing a pressure differential across the zone of coalescence to force the oil out of the coalescence zone.

17. The method of claim 16 including, developing the pressure differential across the zone of coalescence with the level of liquids within the second predetermined range of temperature.

18. The method of claim 17 including, adding an emulsion-breaking chemical to the oil well emulsion prior to flowing upwardly all of the production to be treated through the *first* body of [water] *production* within the first predetermined range of temperature.

19. The method of claim 18 including, cooling the withdrawn gas to condense storageable liquid hydrocarbons and returning the liquid to the emulsion passed downwardly through the *second* body of production within the second predetermined range of temperature.

20. Apparatus for the treatment of oil well production including, a first chamber into which the production is received, a *first* body of [water] *production* in the first chamber, a first source of heat for the *first* body of [water] *production*, means for regulating the first source of heat to raise the temperature of the production *dispersed* [passed] up through the *first* body of [water] *production* to lower the viscosity of the *dispersed* production to where foam of the *dispersed* production will be effectively reduced, a second chamber into which *production* [water] from the *first* body of [water] *production* in the first chamber and the *dispersed* production is received, a second source of heat for the production in the second chamber passed downwardly over the second source of heat, means for regulating the second source of heat to produce thermal currents in the production to further degas the production and to prepare the production for coalescence, a third chamber to receive the production and coalesce the oil and migrate it upward and coalesce the water and migrate it downward, and a conduit between the first and second chambers in heat exchange relationship with the third chamber so the heat of the *dispersed production* [water] and production from the first chamber will prevent condensation of any water vapor above the coalesced oil into the oil.

21. The apparatus of claim 20 including, means responsive to the level of production in the second chamber controlling the release of gas from the chambers to develop a differential pressure across the third chamber to force the oil from the third chamber.

22. The apparatus of claim 20 including, means for adding a predetermined amount of emulsion-breaking chemical to the *dispersed* production prior to the *dispersed* production being received in the first chamber.

23. The apparatus of claim 21 including, a condenser receiving the hydrocarbon vapors from the degassed production to condense that part of them which can be stored under substantially ambient temperatures and pressures, and means for returning the condensed liquids to the second chamber.

24. The apparatus of claim 23 including, means for supplying the oil well production to the first chamber to the condenser as a heat exchange medium with which to condense the hydrocarbon vapors.

25. Apparatus for treating oil well production including, a first source of heat, a *first* body of [water] *production* heated to within a first predetermined range of temperature by the first source of heat, means for dispersing a foamy oil well production upwardly through the heated *first* body of *production* [water] to lower the viscosity of the *dispersed* production until the foam is effectively reduced, a second source of heat, means for passing the defoamed production downwardly over the second source of heat and maintaining the production heated in a *second* body of a size to give a residence time which will enable the thermal currents developed to roll and mix and further degas the production to a substantial degree, means to control the release of gas from the first and second heating to develop a force on the surface of the production passed downwardly over the second source of heat which will maintain the level at a predetermined height, means defining a coalescence zone, means passing the production from the second source of heat upwardly through the coalescence zone to collect oil at the top of the zone and withdraw the oil from the process, and means arranging the defoamed production from the first heating in heat exchange relationship with the top of the coalescence zone to prevent condensation of water from the vapor at the top of the zone into the coalesced oil.

26. The apparatus of claim 25 including, means for adding a predetermined amount of emulsion-breaking chemical to the production prior to dispersing the production through the *first* body of heated [water] *production*.

27. The apparatus of claim 25 including, a condenser arranged to cool the gas released from the production by the heating and condense storageable liquids, therefrom, and means for returning the liquid to the defoamed production which was passed downwardly over the second source of heat.

28. Apparatus for the treatment of oil well production including, a first chamber into which the production is received, a *first* body of [water] *production* in the first chamber, a first source of heat for the *first* body of [water] *production*, means regulating the first source of heat to raise the temperature of the production *dispersed* [passed] up through the *first* body of [water] *production* to lower the viscosity of the *dispersed* production to where foam of the *dispersed* production will be effectively reduced while not elevating the skin temperature of the first heat source so high as to produce coking on the surface of the first heat source, a second chamber into which [water] *production* from the *first* body of *production* [water] in the first chamber and the *dispersed* production is received, a second source of heat for the production in the second chamber passed downwardly over the second source of heat, means regulating the second source of heat to produce thermal currents in the production to further degas the production and to prepare the production for coalescence while not elevating the skin temperature of the second heat source so high as to produce coking on the surface of the second heat source, a third chamber receiving the production from the second chamber to coalesce the oil and migrate it upward and coalesce the water and migrate it downward, and means for withdrawing the gas and water and oil separately.

29. The apparatus of claim 28 including, means with which a pressure differential is developed between the second and third chambers to force the oil out of the third chamber.

30. The apparatus of claim 29 in which, the means developing the pressure differential is directly responsive to the level of liquids of the second chamber.

31. The apparatus of claim 28 including, a condenser receiving the gas evolved from the first and second chambers to condense storageable liquid hydrocarbons therefrom and return those liquids to the second chamber.

32. The apparatus of claim 28 including, a means for adding a predetermined amount of emulsion-breaking chemical to the oil well emulsion prior to flowing upwardly all the products to be treated through the first chamber.

33. Apparatus for the treatment of oil well production including, a first chamber into which the production is received, a *first* body of [water] *production* in the first chamber, a first source of heat for the *first* body or [water] *production*, means regulating the first source of heat to raise the temperature of the production *dispersed* [passed] up through the *first* body of [water] *production* to lower the viscosity of the *dispersed* production to where foam of the *dispersed* production will be effectively reduced while not elevating the skin temperature of the first heat source so high as to produce coking on the surface of the first heat source, a second chamber into which [water] *production* from the *first* body of [water] in the first chamber and the *dispersed* production is received, a second source of heat for the production in the second chamber passed downwardly over the second source of heat, means regulating the second source of heat to produce thermal currents in the production to further degas the production and to prepare the production for coalescence while not elevating the skin temperature of the second heat source so high as to produce coking on the surface of the second heat source, a third chamber in the unified vessel located between the first and second chambers and in heat exchange relation to them while oil is coalesced and migrated upward and water is coalesced and migrated downward, and conduits connected to the second and third chambers through which gas and oil and water are separately removed.

34. The apparatus of claim 33 including, means for developing a pressure differential between the second chamber and the third chamber to force oil from the third chamber in its conduit.

35. The apparatus of claim 34 in which the means developing the pressure differential responds to the level of the liquids in the second heating zone.

36. The apparatus of claim 34 including, means for adding a predetermined quantity of emulsion-breaking chemical to the oil well emulsion prior to flowing all of the products to be treated through the first chamber.

37. The apparatus of claim 35 including, a heat exchanger for cooling the gas of the process sufficiently to condense storageable liquid hydrocarbons from the gas and returning the liquids to the emulsion passed to the second chamber.

38. A horizontal treater for oil well emulsion including, a first compartment in the treater shell, a first firetube in the first compartment controlled to raise the temperature of emulsion flowing upwardly over the firetube to reduce the viscosity of the emulsion and evolve hydrocarbon and water vapors, a second compartment in the treater shell, a second firetube in the second compartment controlled to further raise the temperature of the emulsion flowed downwardly over the firetube from the first compartment until the emulsion film is broken as water is removed downwardly at a rate which militates against substantially heating the water further, a third compartment in the treater shell into which the oil and broken emulsion of the second compartment is flowed for coalescence of the oil in its top and water in its bottom, a condenser receiving the evolved vapors from the first and second compartments to condense the storageable liquid hydrocarbons from the evolved vapors, and return the liquid to the second chamber, a conduit for removing any uncondensed vapor and liquid carryover from the condenser and placing the vapor in the third compartment above the oil surface and the liquid in the third compartment below the oil surface, and conduits connected to the second and third compartments for withdrawing the gas and water and oil separately.

39. The treater of claim 38 including, a coalescing structure in the third compartment, a valve in the conduit between the condenser and the third compartment, and a level responsive means in the second compartment detecting the liquid level controlling the valve to develop a pressure differential between the second and third compartments which will force the emulsion from the second compartment and the oil from the third compartment.

*40. The method of treating oil well production including,*

*heating a first body of production with a first source of heat,*

*introducing an oil well production through the first heated body of production to lower the viscosity of the introduced production,*

*passing the introduced production along a flow path in a relatively thin sheet,*

*passing the introduced production over a second source of heat in a second body of production,*

*passing the substantially degassed production from the second body of production upwardly through a coalescence zone,*

*collecting the oil above the zone,*

*and withdrawing the oil from the process.*

*41. Apparatus for the treatment of oil well production, including,*

*a first chamber into which the production is received,*

*a first body of production in the first chamber,*

*a first source of heat for the first body of production,*

*means for introducing an oil well production through the first heated body of production to lower the viscosity of the introduced production,*

*an elongated passage connected to the first chamber which conducts the introduced production from the first chamber in a relatively thin sheet,*

*a second chamber connected to the elongated passage into which production from the first body of production in the first chamber and the introduced production is received,*

*a second source of heat for the production received in the second chamber,*

*a third chamber connected to the second chamber and containing a coalescing structure which receives the production and coalesces the oil into a body above the structure and the water into a body below the structure,*

*and means for separate removal of oil and water from the third chamber.*

*42. The method of treating oil well production including,*

*heating a first body of production with a first source of heat,*

*Yowing and dispersing the oil well production upwardly through the first heated body of production to lower the viscosity of the dispersed production,*

*passing the dispersed production along a horizontal flow path in a relatively thin sheet,*

*passing the dispersed production downwardly over a second source of heat in a second body of production,*

*passing the substantially degassed production from the second body of production upwardly through a coalescence zone,*

*withdrawing water from below the coalescence zone, and withdrawing oil from above the coalescence zone.*

*43. Apparatus for the treatment of oil well production including,*

*a first chamber into which the production is received,*

*a first body of production in the first chamber,*

*a first source of heat for the first body of production,*

*means for dispersing an oil well production through the first heated body of production to lower the viscosity of the dispersed production and flowing the dispersed production upwardly over the first source of heat,*

*an elongated passage connected to the top of the first chamber which conducts the dispersed production from the first chamber in a relatively thin sheet,*

*a second chamber connected to the elongated passage into which production from the first body of production in the first chamber and the dispersed production is received,*

*a second source of heat mounted in the second chamber and arranged to have the dispersed production flowed downwardly thereover,*

*a third chamber connected to the second chamber to receive the production from the second chamber,*

*a coalescing structure in the third chamber arranged to have the production flowed upwardly therethrough to coalesce the oil and collect it above the structure and coalesce the water and collect it below the structure,*

*and means for separately withdrawing the oil and water from the third chamber.*

*44. The method of claim 42 including, developing a pressure differential across the zone of coalescence to force oil out of the coalescence zone.*

*45. The apparatus of claim 43 including, means with which a pressure differential is developed between the second and third chambers to force the oil out of the third chamber.*

*46. The method of claim 44 including, developing the pressure differential across the zone of coalescence with the level of the second body of the production.*

*47. The apparatus of claim 45 in which, the means developing the pressure differential is directly responsive to the level of production liquids in the second chamber.*

*48. The method of claim 42 including, cooling the gas evolved from the production to condense storageable liquid hydrocarbons and combining the liquids with the oil withdrawn.*

*49. The apparatus of claim 43 including, a condenser receiving gas evolved from the production to condense storageable liquid hydrocarbons therefrom and return those liquids to the oil withdrawn.*

*50. The method of claim 42 including, adding an emulsion-breaking chemical to the production prior to flowing upwardly all of the dispersed production to be treated through the first body of production.*

*51. The apparatus of claim 43 including, a means for adding a predetermined amount of emulsion-breaking chemical to the production prior to flowing upwardly all the dispersed production to be treated through the first body of production.*

References Cited in the file of this patent or the original patent

UNITED STATES PATENTS

| | | |
|---|---|---|
| 2,598,988 | Glasgow | June 3, 1952 |
| 2,601,903 | Erwin | July 1, 1952 |
| 2,601,904 | Erwin | July 1, 1952 |
| 2,664,170 | Walker et al. | Dec. 29, 1953 |
| 2,713,919 | Walker et al. | July 26, 1955 |
| 2,751,998 | Glasgow | June 26, 1956 |